(12) United States Patent
Leach

(10) Patent No.: US 8,555,429 B2
(45) Date of Patent: Oct. 15, 2013

(54) ADJUSTABLE CONTOURED BABY BATHING OR PET CUSHION

(76) Inventor: Jamie S. Leach, Ada, OK (US)

( * ) Notice: Subject to any disclaimer, the term of this patent is extended or adjusted under 35 U.S.C. 154(b) by 1788 days.

(21) Appl. No.: 11/193,195

(22) Filed: Aug. 1, 2005

(65) Prior Publication Data
US 2007/0022526 A1 Feb. 1, 2007

(51) Int. Cl.
*A47K 3/024* (2006.01)

(52) U.S. Cl.
USPC .......................................................... 4/572.1

(58) Field of Classification Search
USPC ................ 4/571.1, 572.1, 573.1, 578.1, 579; 5/636, 653, 655; 119/28.5
See application file for complete search history.

(56) References Cited

U.S. PATENT DOCUMENTS

| | | | |
|---|---|---|---|
| 395,043 | A | 12/1888 | Doremus |
| 416,970 | A | 12/1889 | Taylor |
| 726,164 | A | 4/1903 | Hogan et al. |
| 909,453 | A | 1/1909 | Pullman |
| 1,376,625 | A | 5/1921 | Johnston |
| 1,447,288 | A | 3/1923 | Emmerich |
| 1,577,586 | A | 3/1926 | Morehouse |
| 1,769,722 | A | 7/1930 | Sutton |
| 2,149,140 | A | 2/1939 | Gonzalez-Rincones |
| D124,296 | S | 12/1940 | Thompson |
| 2,279,867 | A | 4/1942 | Falk |
| 2,328,871 | A | 9/1943 | Woehler |
| 2,336,707 | A | 12/1943 | Thompson |
| 2,404,108 | A | 7/1946 | Stauffacher et al. |
| 2,404,505 | A | 7/1946 | Knecht |
| 2,429,350 | A | 10/1947 | Farrand |
| 2,451,007 | A | 10/1948 | White |
| 2,495,482 | A | 1/1950 | Rogatz |
| 2,502,486 | A | 4/1950 | Savrin |
| 2,544,896 | A | 3/1951 | Nidetch et al. |
| D162,858 | S | 4/1951 | McGlinchey |
| 2,626,407 | A | 1/1953 | Kurry |
| 2,652,183 | A | 9/1953 | Hlivka |
| 2,694,202 | A | 11/1954 | Macrides |
| 2,694,204 | A | 11/1954 | Cross |
| 2,741,412 | A | 4/1956 | Hinkle |
| 2,795,802 | A | 6/1957 | Myers |
| 2,817,090 | A | 12/1957 | Toellner |
| 2,857,957 | A | 10/1958 | Gay |
| 2,880,424 | A | 4/1959 | Kalensky |
| D191,513 | S | 10/1961 | Kerr |
| 3,088,438 | A | 5/1963 | Oliphant |
| D201,492 | S | 6/1965 | Jacobson |
| 3,239,271 | A | 3/1966 | Bergersen |
| 3,298,035 | A | 1/1967 | Gobins |
| 3,327,330 | A | 6/1967 | McCullough |

(Continued)

FOREIGN PATENT DOCUMENTS

JP 2004/194989 7/2004
WO 02/21979 A1 3/2002

OTHER PUBLICATIONS

Abstract, JP 2004 194989, Jul. 15, 2004, ESPACENET.

*Primary Examiner* — Lori Baker
(74) *Attorney, Agent, or Firm* — Mary M. Lee

(57) ABSTRACT

A contoured adjustable baby or pet bathing cushion with a substantially oval shaped outer portion and a depressed central portion, the substantially oval shaped outer portion being provided with adjustable tabs to facilitate adjustment of the length of the cushion to accommodate an infant, a larger baby, or a pet.

14 Claims, 4 Drawing Sheets

(56) References Cited

U.S. PATENT DOCUMENTS

| | | |
|---|---|---|
| 3,392,737 A | 7/1968 | Fefferman |
| 3,604,026 A | 9/1971 | Scheips |
| 3,604,750 A | 9/1971 | Doering |
| 3,671,977 A | 6/1972 | Degnon |
| 3,713,692 A | 1/1973 | McCracken et al. |
| D227,423 S | 6/1973 | Ando |
| 3,773,287 A | 11/1973 | Hechinger |
| D230,804 S | 3/1974 | Lijewski |
| 3,840,916 A | 10/1974 | Jennings |
| 3,848,281 A | 11/1974 | Matthews |
| 3,899,210 A | 8/1975 | Samhammer et al. |
| 3,899,797 A | 8/1975 | Gunst |
| 3,902,456 A * | 9/1975 | David .................. 119/28.5 |
| 3,911,512 A | 10/1975 | Plate |
| D244,569 S | 6/1977 | Laroye |
| 4,027,888 A | 6/1977 | Wilcox |
| 4,031,567 A | 6/1977 | Planck |
| 4,037,764 A | 7/1977 | Almosnino et al. |
| 4,050,737 A | 9/1977 | Jordan |
| 4,173,048 A | 11/1979 | Varaney |
| 4,179,158 A | 12/1979 | Flaum et al. |
| 4,194,254 A | 3/1980 | Torrez |
| 4,197,604 A | 4/1980 | Nakamura |
| 4,227,270 A | 10/1980 | Rivera |
| 4,235,474 A | 11/1980 | Rosenberg |
| 4,236,264 A | 12/1980 | Britzman |
| D259,902 S | 7/1981 | Rock |
| 4,287,542 A | 9/1981 | Okuda |
| D265,027 S | 6/1982 | Meyers |
| D266,800 S | 11/1982 | Kula et al. |
| 4,383,713 A | 5/1983 | Roston |
| 4,393,530 A | 7/1983 | Stark |
| 4,428,514 A | 1/1984 | Elf |
| 4,434,920 A | 3/1984 | Moore |
| 4,463,984 A | 8/1984 | Molnar |
| 4,506,396 A | 3/1985 | Ritchie, Jr. et al. |
| 4,550,459 A | 11/1985 | Endel et al. |
| D282,472 S | 2/1986 | O'Sullivan |
| 4,574,412 A | 3/1986 | Smith |
| D284,220 S | 6/1986 | Pote |
| 4,592,589 A | 6/1986 | Hellwig |
| 4,606,078 A | 8/1986 | Tkacsik |
| 4,606,087 A | 8/1986 | Alivizatos |
| 4,624,021 A | 11/1986 | Hofstetter |
| 4,654,907 A | 4/1987 | Haugaard |
| 4,666,017 A | 5/1987 | Zimmerman |
| 4,667,356 A | 5/1987 | Holmquist |
| 4,667,624 A | 5/1987 | Smith |
| 4,670,923 A | 6/1987 | Gabriel et al. |
| 4,676,198 A | 6/1987 | Murray |
| 4,676,554 A | 6/1987 | Harlick et al. |
| 4,685,163 A | 8/1987 | Quillen et al. |
| 4,698,862 A | 10/1987 | Mairs |
| 4,709,430 A | 12/1987 | Nicoll |
| 4,712,258 A | 12/1987 | Eves |
| 4,731,890 A | 3/1988 | Roberts |
| 4,754,509 A | 7/1988 | Pollard |
| 4,754,510 A | 7/1988 | King |
| 4,757,925 A | 7/1988 | Knittel |
| 4,763,369 A | 8/1988 | Spector |
| D298,198 S | 10/1988 | O'Sullivan |
| 4,788,726 A | 12/1988 | Rafalko |
| 4,790,035 A | 12/1988 | Whyte |
| 4,794,657 A | 1/1989 | Avery |
| 4,796,315 A | 1/1989 | Crew |
| D299,988 S | 2/1989 | Parabita |
| 4,827,542 A | 5/1989 | Kurtenbach |
| 4,834,459 A | 5/1989 | Leach |
| 4,836,605 A | 6/1989 | Greenwood et al. |
| 4,840,144 A | 6/1989 | Voorhees et al. |
| 4,850,144 A | 7/1989 | Grisham et al. |
| 4,853,994 A | 8/1989 | Ekstein |
| 4,861,109 A | 8/1989 | Leach |
| D303,897 S | 10/1989 | Phillips |
| 4,871,210 A | 10/1989 | Alexander et al. |
| 4,901,384 A | 2/1990 | Eary |
| D306,948 S | 4/1990 | Zollinger |
| D308,788 S | 6/1990 | Boehm |
| D309,018 S | 7/1990 | Leach |
| D310,609 S | 9/1990 | Burkhardt |
| D313,141 S | 12/1990 | Witter et al. |
| 4,980,937 A | 1/1991 | Mason et al. |
| 4,986,458 A | 1/1991 | Linday |
| 4,996,734 A | 3/1991 | Rowe |
| 4,999,863 A | 3/1991 | Kane |
| 4,999,866 A | 3/1991 | Lindsey |
| 5,015,037 A | 5/1991 | Giblin et al. |
| 5,026,315 A | 6/1991 | Chap |
| D318,202 S | 7/1991 | Weber |
| 5,035,013 A | 7/1991 | Bloom |
| D318,969 S | 8/1991 | Byrn |
| 5,048,136 A | 9/1991 | Popitz |
| 5,088,141 A | 2/1992 | Meyer et al. |
| 5,097,551 A | 3/1992 | Smith |
| 5,103,514 A | 4/1992 | Leach |
| 5,109,557 A | 5/1992 | Koy et al. |
| 5,115,524 A | 5/1992 | Antosko |
| 5,119,767 A | 6/1992 | Jimenez |
| 5,154,649 A | 10/1992 | Pender |
| 5,159,727 A | 11/1992 | McCracken |
| 5,161,260 A | 11/1992 | Reynolds |
| 5,165,130 A | 11/1992 | Wendling |
| 5,178,309 A | 1/1993 | Bicheler et al. |
| 5,179,741 A | 1/1993 | Book |
| D332,865 S | 2/1993 | Wilmink |
| 5,187,309 A | 2/1993 | Esch et al. |
| 5,193,238 A | 3/1993 | Clute |
| 5,216,772 A | 6/1993 | Clute |
| D339,923 S | 10/1993 | Clarke |
| 5,249,308 A | 10/1993 | Blume |
| 5,261,134 A | 11/1993 | Matthews |
| D342,615 S | 12/1993 | Asher |
| 5,269,323 A | 12/1993 | Krouskop |
| 5,272,780 A | 12/1993 | Clute |
| 5,279,237 A * | 1/1994 | Alivizatos .................. 4/572.1 X |
| 5,310,245 A | 5/1994 | Lyszczasz |
| 5,325,818 A | 7/1994 | Leach |
| 5,339,472 A | 8/1994 | Yin |
| 5,341,531 A | 8/1994 | Straub et al. |
| 5,346,278 A | 9/1994 | Dehondt |
| 5,363,524 A | 11/1994 | Lang |
| 5,365,613 A | 11/1994 | Henegan |
| 5,371,909 A | 12/1994 | McCarty |
| D355,306 S | 2/1995 | Moses |
| 5,392,785 A * | 2/1995 | Donahue .................. 5/655 |
| 5,429,852 A | 7/1995 | Quinn |
| 5,439,008 A | 8/1995 | Bowman |
| D365,241 S | 12/1995 | Braden et al. |
| 5,473,785 A | 12/1995 | Lager et al. |
| D366,368 S | 1/1996 | McCarthy |
| 5,490,528 A | 2/1996 | Day |
| D369,054 S | 4/1996 | Straub et al. |
| D369,934 S | 5/1996 | Straub et al. |
| 5,519,906 A | 5/1996 | Fanto-Chan |
| D370,585 S | 6/1996 | Faithfull |
| 5,522,528 A | 6/1996 | Petricola |
| 5,546,620 A | 8/1996 | Matthews |
| 5,551,109 A | 9/1996 | Tingley et al. |
| 5,557,815 A * | 9/1996 | Mintz et al. .................. 5/636 |
| D375,557 S | 11/1996 | Dixon |
| 5,570,823 A | 11/1996 | Lindy |
| 5,572,753 A | 11/1996 | Ruscitto |
| 5,581,833 A | 12/1996 | Zenoff |
| 5,586,351 A | 12/1996 | Ive |
| D377,423 S | 1/1997 | Latrella et al. |
| D377,881 S | 2/1997 | Watt |
| 5,621,919 A | 4/1997 | Graham |
| 5,647,076 A | 7/1997 | Gearhart |
| D381,790 S | 8/1997 | Harris et al. |
| D382,435 S | 8/1997 | Schaffner et al. |
| 5,661,861 A | 9/1997 | Matthews |
| 5,664,271 A | 9/1997 | Bellavance |
| 5,685,016 A | 11/1997 | Douglas |
| 5,699,569 A | 12/1997 | Schwarz-Zöhrer |

(56) References Cited

U.S. PATENT DOCUMENTS

| | | |
|---|---|---|
| D388,589 S | 1/1998 | Walker |
| 5,708,982 A | 1/1998 | Armani |
| 5,778,470 A | 7/1998 | Haider |
| 5,813,066 A | 9/1998 | Gebhard et al. |
| 5,826,287 A | 10/1998 | Tandrup |
| 5,839,138 A | 11/1998 | Weidman et al. |
| 5,857,598 A | 1/1999 | Dunne |
| D408,676 S | 4/1999 | Straub et al. |
| D409,038 S | 5/1999 | Rojas, Jr. et al. |
| D412,234 S | 7/1999 | Cox |
| 5,930,854 A | 8/1999 | O'Neil et al. |
| D413,751 S | 9/1999 | Alyea |
| 5,946,725 A | 9/1999 | Shatzkin et al. |
| 5,950,887 A | 9/1999 | Powell |
| D414,915 S | 10/1999 | Anderson |
| D416,745 S | 11/1999 | Noyes |
| 5,978,990 A | 11/1999 | Akey |
| 5,979,981 A | 11/1999 | Dunne et al. |
| 5,987,674 A | 11/1999 | Schaffner et al. |
| D419,819 S | 2/2000 | Bartoli |
| D420,845 S | 2/2000 | Rumage |
| 6,026,525 A | 2/2000 | Davis |
| 6,038,720 A | 3/2000 | Matthews et al. |
| 6,045,178 A | 4/2000 | Miller |
| 6,049,929 A | 4/2000 | Rawson |
| 6,052,848 A | 4/2000 | Kelly |
| 6,055,687 A | 5/2000 | Matthews |
| 6,061,854 A | 5/2000 | Crowley |
| 6,065,655 A | 5/2000 | Parewick |
| 6,079,067 A | 6/2000 | Becker et al. |
| 6,088,854 A | 7/2000 | Brownrigg |
| 6,112,960 A | 9/2000 | Seering et al. |
| 6,119,873 A | 9/2000 | Matthews |
| 6,123,389 A | 9/2000 | O'Connor et al. |
| D431,745 S | 10/2000 | Jackson |
| 6,141,805 A | 11/2000 | Fisher-Cohen et al. |
| 6,141,807 A | 11/2000 | Tapper |
| 6,205,600 B1 | 3/2001 | Sedlack |
| 6,209,962 B1 | 4/2001 | Sobel et al. |
| 6,212,717 B1 | 4/2001 | Cooper |
| 6,213,362 B1 | 4/2001 | Lorenzini et al. |
| D443,461 S | 6/2001 | Hall et al. |
| D444,981 S | 7/2001 | Hall et al. |
| D445,506 S | 7/2001 | Vinson et al. |
| D446,675 S | 8/2001 | Straub |
| 6,279,185 B1 | 8/2001 | Matthews |
| D447,376 S | 9/2001 | Kramer |
| D450,517 S | 11/2001 | Darling et al. |
| D453,653 S | 2/2002 | Tunnell |
| 6,343,727 B1 | 2/2002 | Leach |
| 6,349,437 B1 | 2/2002 | Horning |
| 6,354,665 B1 | 3/2002 | Ross |
| 6,408,463 B1 | 6/2002 | Palacio |
| 6,412,128 B1 | 7/2002 | Matthews |
| 6,427,251 B1 | 8/2002 | Leach |
| 6,434,769 B1 | 8/2002 | Koenig |
| 6,434,770 B2 | 8/2002 | Matthews Brown |
| 6,453,493 B1 | 9/2002 | Matthews Brown |
| 6,457,195 B1 | 10/2002 | Holste |
| 6,463,608 B1 | 10/2002 | Moe |
| 6,484,337 B1 | 11/2002 | Moe et al. |
| D467,117 S | 12/2002 | Guy |
| 6,499,164 B1 | 12/2002 | Leach |
| 6,499,165 B1 | 12/2002 | Morgillo |
| 6,505,366 B1 | 1/2003 | Lied |
| 6,532,612 B2 | 3/2003 | Matthews Brown |
| 6,539,567 B1 | 4/2003 | Bae |
| 6,553,590 B1 | 4/2003 | Leach |
| 6,574,810 B2 | 6/2003 | Mangiaracina |
| 6,601,252 B1 | 8/2003 | Leach |
| 6,625,828 B2 | 9/2003 | Matthews Brown |
| 6,640,977 B2 | 11/2003 | Matthews Brown et al. |
| 6,658,681 B2 | 12/2003 | Britto et al. |
| 6,662,390 B1 | 12/2003 | Berger |
| 6,671,907 B1 | 1/2004 | Zuberi |
| 6,671,908 B2 | 1/2004 | Brown et al. |
| 6,685,024 B1 | 2/2004 | Matthews |
| 6,692,072 B2 | 2/2004 | Nelson et al. |
| 6,708,354 B1 | 3/2004 | Carter et al. |
| 6,711,770 B1 | 3/2004 | Owens et al. |
| 6,751,817 B1 | 6/2004 | Leach |
| D492,533 S | 7/2004 | Cole |
| 6,760,934 B1 | 7/2004 | Leach |
| 6,763,539 B1 | 7/2004 | Bartley et al. |
| D493,964 S | 8/2004 | Low |
| 6,802,092 B1 | 10/2004 | Klein |
| 6,814,405 B2 | 11/2004 | Norman |
| 6,851,143 B2 | 2/2005 | Matthews Brown |
| 6,857,150 B2 | 2/2005 | Matthews Brown et al. |
| D503,063 S | 3/2005 | Bartle et al. |
| 6,874,183 B1 | 4/2005 | Taylor |
| 6,892,406 B2 | 5/2005 | Littlehorn |
| 6,905,169 B1 | 6/2005 | Donoghue |
| 6,920,655 B2 | 7/2005 | Mitchell |
| 6,944,898 B2 | 9/2005 | Matthews Brown et al. |
| 7,000,273 B2 | 2/2006 | Rivera-Wienhold et al. |
| 7,000,274 B2 | 2/2006 | Matthews Brown et al. |
| 7,000,275 B2 | 2/2006 | Matthews Brown et al. |
| 7,000,766 B2 | 2/2006 | Matthews Brown et al. |
| 7,010,821 B1 | 3/2006 | Leach |
| 7,017,212 B2 | 3/2006 | Matthews Brown |
| D518,989 S | 4/2006 | Clapp |
| 7,055,196 B2 | 6/2006 | Littlehorn |
| 7,089,639 B2 | 8/2006 | Matthews Brown et al. |
| 7,114,206 B2 | 10/2006 | Leach |
| 7,127,760 B2 | 10/2006 | Bartley et al. |
| 7,131,156 B1 | 11/2006 | Walker-Craft |
| 7,146,663 B2 | 12/2006 | Brown et al. |
| 7,252,330 B2 * | 8/2007 | Lincoln .................. 5/655 X |
| 2002/0029422 A1 | 3/2002 | Matthews |
| 2004/0060116 A1 | 4/2004 | Matthews-Brown |
| 2005/0210591 A1 | 9/2005 | Mead et al. |
| 2006/0031992 A1 | 2/2006 | Moore |
| 2007/0022526 A1 | 2/2007 | Leach |
| 2007/0028384 A1 | 2/2007 | Leach |
| 2007/0046084 A1 | 3/2007 | Leach |
| 2007/0151031 A1 | 7/2007 | Leach |

\* cited by examiner

ADJUSTABLE CONTOURED BABY BATHING OR PET CUSHION

BACKGROUND OF THE INVENTION

1. Field of the Invention

The present invention relates to an adjustable bathing cushion. More particularly, the present invention is a pillow comprising an outer portion and a depressed central portion wherein the length of the outer portion may be adjusted to fit an infant or pet.

2. Prior Art

There are a number of patents that show or relate to baby or pet pillows. Some of the support pillows are designed particularly for infants, some have combination uses which include a baby or a small animal, and some are adapted to be utilized during bathing. It is believed to be novel to provide a contoured adjustable baby or pet bathing cushion with a substantially oval shaped outer portion and a depressed central portion, the substantially oval shaped outer portion being provided with adjustable tabs to facilitate adjustment of the length of the cushion to accommodate an infant, a larger baby, or a pet. A preliminary patentability search was conducted on this invention and the following listed references were uncovered in the search.

| Patent No. | Inventor | Issue Date |
| --- | --- | --- |
| Des. 282,427 | O'Sullivan | Feb. 4, 1986 |
| Des. 298,198 | O'Sullivan | Oct. 25, 1988 |
| Des. 375,557 | Dixon | Nov. 12, 1996 |
| U.S. Pat. No. D446,675 S | Straub | Aug. 21, 2001 |
| 1,769,722 | Sutton | Jul. 1, 1930 |
| 4,383,713 | Roston | May 17, 1983 |
| 4,606,087 | Alivizatos | Aug. 19, 1986 |
| 4,980,937 | Mason, et al. | Jan. 1, 1991 |
| 5,088,141 | Meyer, et al. | Feb. 18, 1992 |
| 5,165,130 | Wendling | Nov. 24, 1992 |
| 5,193,238 | Clute | Mar. 16, 1993 |
| 5,216,772 | Clute | Jun. 8, 1993 |
| 5,272,780 | Clute | Dec. 28, 1993 |
| 5,363,524 | Lang | Nov. 15, 1994 |
| 5,439,008 | Bowman | Aug. 8, 1995 |
| 5,586,351 | Ive | Dec. 24, 1996 |
| 5,551,109 | Tingley, et al. | Sep. 3, 1996 |
| 5,699,569 | Schwarz-Zöhrer | Dec. 23, 1997 |
| 5,826,287 | Tandrup | Oct. 27, 1998 |
| 5,979,981 | Dunne, et al. | Nov. 9, 1999 |
| U.S. Pat. No. 6,499,165 B1 | Morgillo | Dec. 31, 2002 |
| U.S. Pat. No. 6,354,665 B1 | Ross | Mar. 12, 2002 |
| U.S. Pat. No. 6,553,590 B1 | Leach | Apr. 29, 2003 |
| U.S. Pat. No. 6,505,366 B1 | Lied | Jan. 14, 2003 |
| U.S. Pat. No. 6,574,810 B2 | Mangiaracina | Jun. 10, 2003 |
| U.S. Pat. No. 6,857,150 B2 | Matthews Brown, et al. | Feb. 22, 2005 |

The above patents are not considered to be particularly pertinent to the present invention.

Design Pat. Nos. Des 282,427 and Des 298,198 to O'Sullivan and Des 375,557 to Dixon all disclose a substantially rectangular-shaped pillow having a depressed central section but do not feature any adjustability to accommodate various sizes of babies or pets.

Design U.S. Pat. No. D446,675 S to Straub shows an infant head positioner which does not appear to be related in any way to bathing, nor does it contemplate support or elevation of the legs/feet of an infant.

U.S. Pat. No. 4,383,713 to Roston discloses an orthopedic infant support similar to Straub in that it has portions for surrounding the torso of an infant. In addition, the head support section forms a U-shape. There appears to be no corresponding foot support or leg elevation, although the supports may be moved according to the size of the infant, nor does the patent contemplate bathing.

U.S. Pat. No. 4,606,087 to Alivizatos discloses a convertible body support pad filled with polystyrene beads which may be employed in a plurality of uses. However, the use of polystyrene beads in conjunction with items used in infants of one year or younger is prohibited by the Consumer Products Safety Commission (CPSC), which regulates safety of consumer goods. Therefore, Alivizatos would not be employed for the purposes disclosed herein.

Mason, et al. U.S. Pat. No. 4,980,937 discloses an infant sitting support ring having a raised outer oval-shaped portion in combination with a depressed central portion, the raised outer portion comprising a soft cushiony material to receive the head of an infant if the infant falls backward or to the side, thus preventing a blow to the infant's head.

Meyer, et al. U.S. Pat. No. 5,088,141 discloses a therapeutic pillow for providing head and neck support. The pillow has a substantially rectangular shape with a depressed central portion, and "concaved" sides for proper shoulder-neck alignment. This pillow appears to be suited to an adult user.

Lang U.S. Pat. No. 5,363,524 is a multi-adjustment cervical pillow similar to the pillow disclosed by Meyer, et al. The Lang pillow employs a malleable content such as buckwheat hulls for adjustability. The pillow is further provided with a plurality of snap-type fasteners which allow the pillow to be adjusted into various configurations.

The remaining patents disclose various support mechanisms for securing infants in a seated or reclining position, some with elevated head configurations. However, none of these patents appears to be suited for infant bathing purposes.

SUMMARY OF THE INVENTION

A contoured adjustable bathing cushion with a substantially oval shaped outer portion and a depressed central portion, the substantially oval shaped outer portion being provided with a band of approximately four inches in width onto which adjustable tabs are fixed, the adjustable tabs being provided with a first half of a hook-and-loop or similar type fastener which corresponds with a second half of a hook-and-loop or similar type fastener attached to the band, the hook-and-loop or similar type fasteners are adapted to facilitate adjustment of the length of the cushion to accommodate an infant, a larger baby, or a pet. The contoured adjustable bathing cushion being of sufficient size and adapted for use by an infant, older baby, or pet. The substantially oval shaped outer portion is preferably constructed of a water-permeable fabric that is resistant to mildew and is preferably filled with a batting-type stuffing material. The substantially oval shaped outer portion comprises a top member, a bottom member, an inner edge, and an outer edge having an upper and lower portion. The top member attaches to the upper portion of the outer edge by means of a stitched seam. The bottom member attaches to the lower portion of the outer edge by means of a stitched seam. The outer edge is provided with two fabric arms, one of which is located centrally along each of two long edges of the substantially oval shaped outer portion, the inside or underside of the arms are provided with a first half of a hook-and-loop or similar type fastener. A second half of the hook-and-loop or similar type fastener is located along one half of each long outer edge of the substantially oval shaped outer portion, and corresponds with the first half of the hook-and-loop or similar type fastener located on the corresponding arm to permit adjustment of the length of the longer outer edge of the substantially oval shaped outer portion. The contoured adjustable bathing cushion is further provided with a depressed central section which is created by stitching the top member and bottom member together without any filler material between the two layers at the inner edge of the substantially oval shaped outer portion. The stitching along the inner edge, in conjunction with the absence of filler in the central depressed section, causes the inner edge of the substantially oval shaped outer portion to meet the central depressed section in a tapered arrangement.

The contoured adjustable bathing cushion of the present invention is intended to permit a plurality of positioning options to facilitate cushioning to a baby at various stages of growth during bath time, while maintaining the comfort of the baby in addition to preventing slippage during bath time. Alternatively, the cushion may be used to accommodate a pet, such as a dog or cat, as the length of the cushion may be adjusted to form a nest in which the pet can sleep. A plurality of sizes of adjustable contoured bathing cushion are contemplated by this device so as to accommodate a premature infant or small pet, a full term infant to baby of one year, a medium size pet, or a large pet within the scope of the invention.

DETAILED DESCRIPTION OF THE PREFERRED EMBODIMENTS

Figure 1:
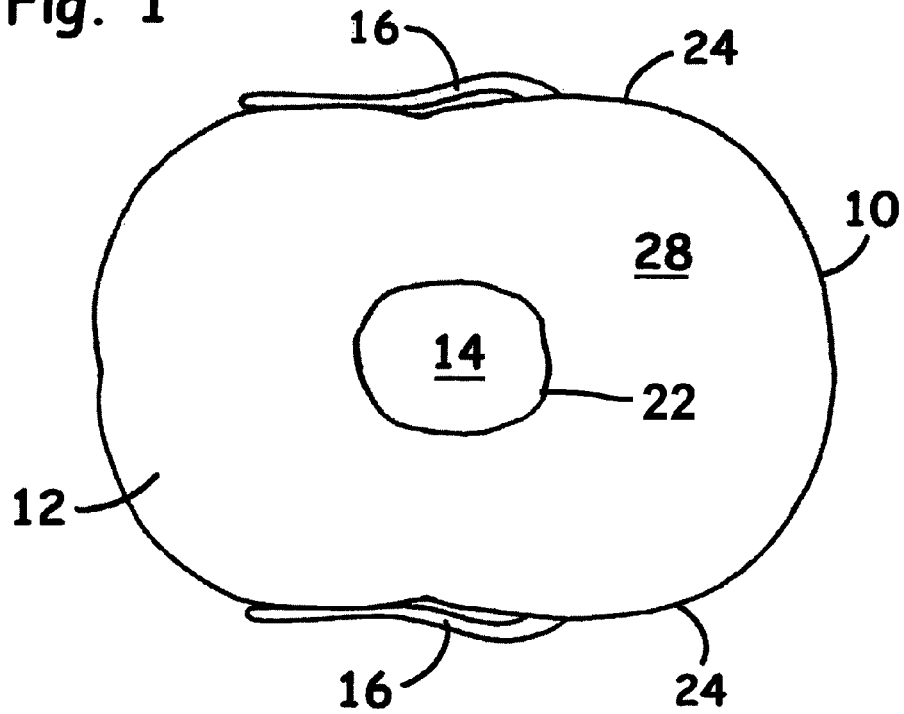
FIG. 1 is a top view of the contoured adjustable bathing cushion of the present invention.

Referring to the drawings in detail, FIG. 1 shows a bottom view of a contoured adjustable bathing cushion 10 comprising a water permeable, mildew-resistant fabric or other suitable fabric filled with a polyester batting or other suitable water permeable and mildew resistant stuffing material safe for the use of infants under one year of age, the contoured adjustable bathing cushion 10 having a substantially oval shaped outer portion 12 and a depressed central portion 14, the depressed central portion 14 is formed by a stitched seam 30 (see FIG. 2) located along the perimeter or inner edge 22 (see FIG. 2) of the depressed central portion 14 which stitched seam causes the fabric comprising an upper portion 26 (see FIG. 2) to contact the fabric comprising the lower portion 28 such that the two fabrics lie together, one on top of the other, to prevent the stuffing material from the substantially oval shaped outer portion 12 entering the depressed central portion 14 as well as providing a reinforced depressed central portion 14, the substantially oval shaped outer portion 12 being provided with stuffing or filler material located between the upper portion 26 and the lower portion 28 to create a cushioned member adapted to support an infant or small animal (not shown in this figure), the substantially oval shaped outer portion 12 has two longer outer edges 24 which outer edges 24 are joined together by means of a band 38 (see FIG. 2) that forms the sidewall that defines the circumferfence of the cushion, the band 38 is provided with a plurality (in this embodiment two are present) of adjustable tabs 16 forming a cinch assembly to facilitate adjustment of the length of the contoured adjustable bathing cushion 10 by drawing the cushion 10 closer or cinching the cushion 10 along its outer edge 24 and band 38 to a desired length to accommodate an infant, a larger baby, or a pet (not shown in this figure). In the initial position, the contoured adjustable bathing cushion 10 comprises a substantially oval shape wherein an inner edge 22 and an outer (longer) edge 24 are disposed in a substantially straight and flat manner. The adjustable tabs 16 are engaging the band 38 (not shown in this figure) by means of a first and second half of a hook-and-loop or similar type fastener 32 and 34, respectively (not visible in this figure). It should be noted that, although the depressed central portion 14 is stitched to prevent the stuffing or filler material from the substantially oval shaped outer portion 12 from entering therein, a thin layer of batting or filler material may be sandwiched between the fabric comprising an upper portion 26 to contact the fabric comprising the lower portion 28 to provide a light cushioning effect within the depressed central portion 12.

Figure 2:
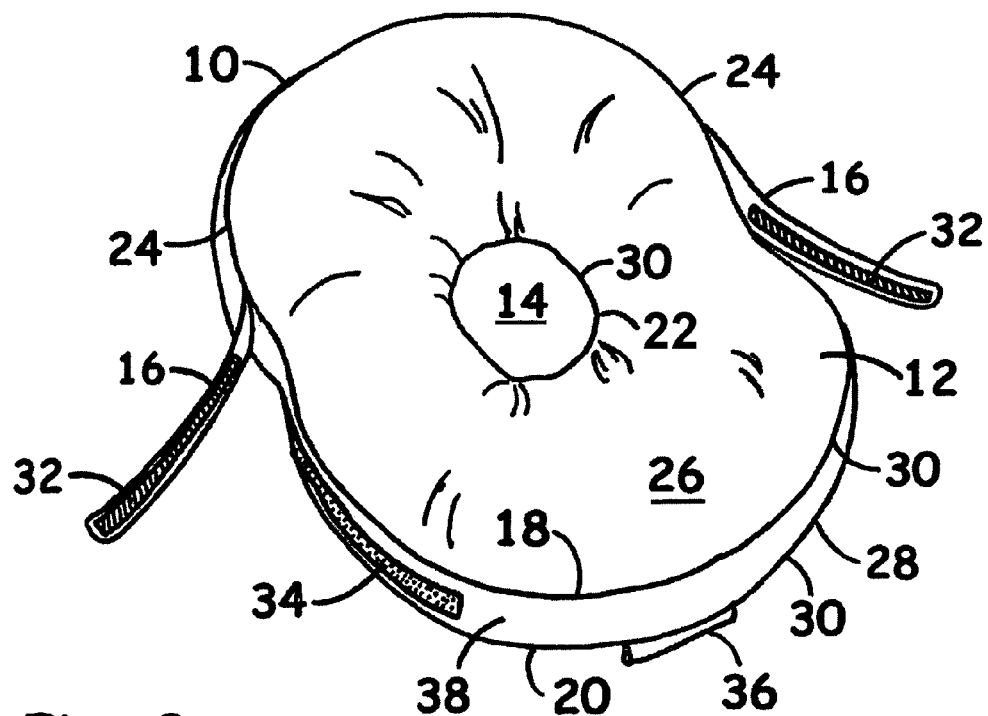
FIG. 2 is a perspective view of the contoured adjustable bathing cushion of the present invention showing the adjustable tabs in an open position.

FIG. 2 shows a contoured adjustable bathing cushion 10 similar to that shown in FIG. 1, the substantially oval shaped outer portion comprising a top member 18, a bottom member 20, an inner edge 22, and an outer edge 24 having an upper portion 26 and a lower portion 28 (not visible in this figure), a band 38 having a width of approximately four inches which band 38 joins the top member attaching to the upper portion of the outer edge by means of a stitched seam 30 and the bottom member attaching to the lower portion of the outer edge by means of a stitched seam 30, the band 38 providing the appropriate height for the contoured adjustable bathing cushion 10 when the filler material (not shown) is in place, the band 38 further providing a point of attachment for the second half of a hook-and-loop or similar type fastener 34 and providing a point of attachment for the adjustable tabs 16. The contoured adjustable bathing cushion 10 having an upper portion 26 upon which an infant or pet (not shown in this figure) may be received, a lower portion 28 which is adapted to rest on the bottom of a bathtub, large sink, or other substantially flat surface, the lower portion 28 is adapted to provide a stable foundation for the contoured adjustable bathing cushion 10, the contoured adjustable bathing cushion 10 further having the adjustable tabs 16 abducted with relation to the band 38, the underside of each of the adjustable tabs 16 being provided with a first half of a hook-and-loop or similar type fastener 32, and the band 38 being provided with a second half of a hook-and-loop or similar type fastener 34 adapted to correspond to the first half of the hook-and-loop or similar type fastener 32 upon contact. Depending on where the first half of the hook-and-loop or similar type fastener 32 contacts the second half of the hook-and-loop or similar type fastener, the length of the outer edge 24 and band 38 of the contoured adjustable bathing cushion 10 may be adjusted so as to make the outer edge 24 full length or shortened to a customizable desired length depending on the size of the infant (or pet) as will hereinafter appear. A hanging loop 36 may be provided to permit the contoured adjustable bathing cushion to hang from a shower rod or similar device during the drying process (not shown) by means of inserting a hanger or hook through the hanging loop 36.

Figure 3:
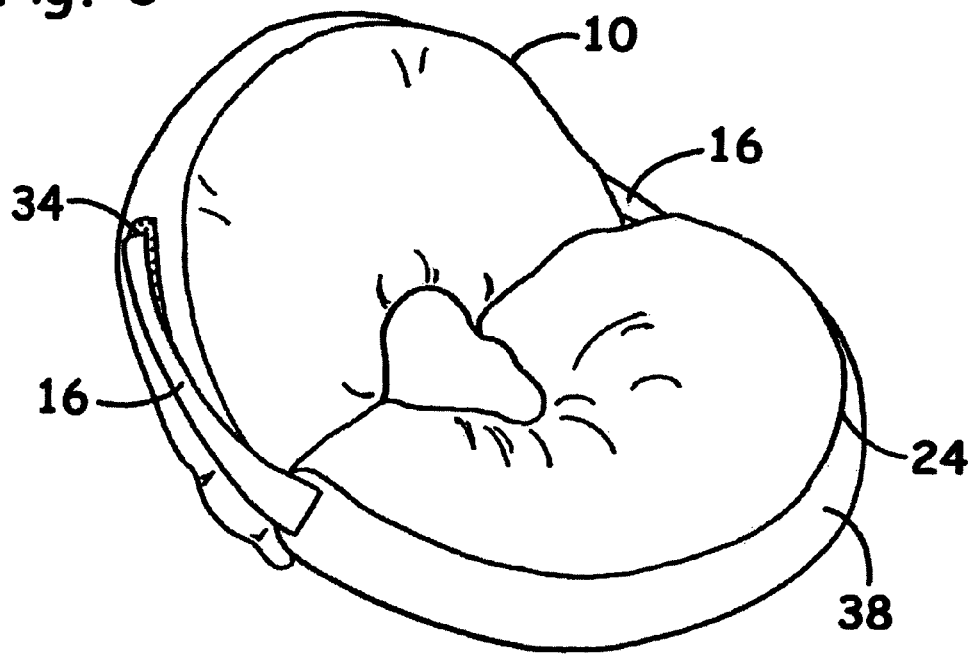
FIG. 3 is a perspective view of the contoured adjustable bathing cushion of the present invention showing the adjustable tabs positioned so as to gather or cinch the cushion, folding it into a semi-upright position.

FIG. 3 shows a contoured adjustable bathing cushion 10 wherein the cushion has been folded along the outer edge 24 and band 38 to elevate one half of the contoured adjustable bathing cushion 10. The adjustable tabs 16 are positioned such that the first half of the hook-and-loop or similar type fastener 32 (see FIG. 2) engages the second half of the hook-and-loop or similar type fastener 34 at the farthest end thereof, thereby achieving a shortened overall length of the contoured adjustable bathing cushion 10 and securing the cushion in a semi-upright position for an infant or baby who is seated during bathing.

Figure 4:
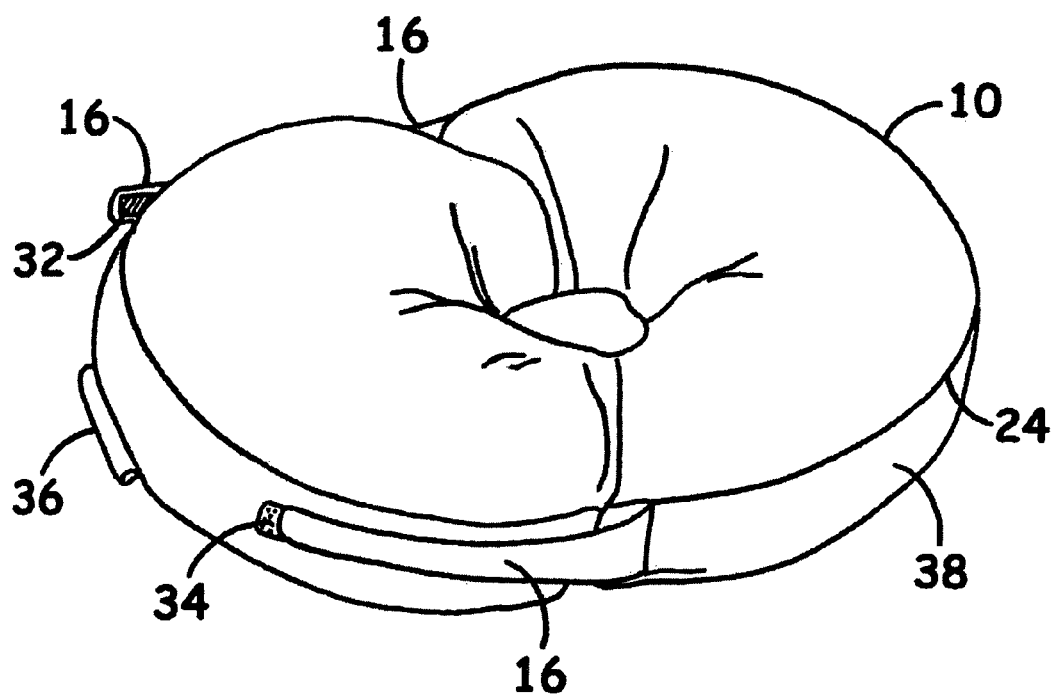
FIG. 4 is a perspective view of the contoured adjustable bathing cushion of the present invention showing the adjustable tabs in a closed position.

FIG. 4 shows a contoured adjustable bathing cushion 10 wherein the cushion has been shortened along the outer edge 24 and band 38 but wherein the cushion remains in a substantially flat horizontal position. The adjustable tabs 16 are positioned such that the first half of the hook-and-loop or similar type fastener 32 engages the second half of the hook-and-loop or similar type fastener 34 (see FIG. 2) at the farthest end thereof, thereby achieving a shortened overall length of the contoured adjustable bathing cushion 10 and securing the cushion in a compacted position to accommodate a smaller infant during bathing.

Figure 5:
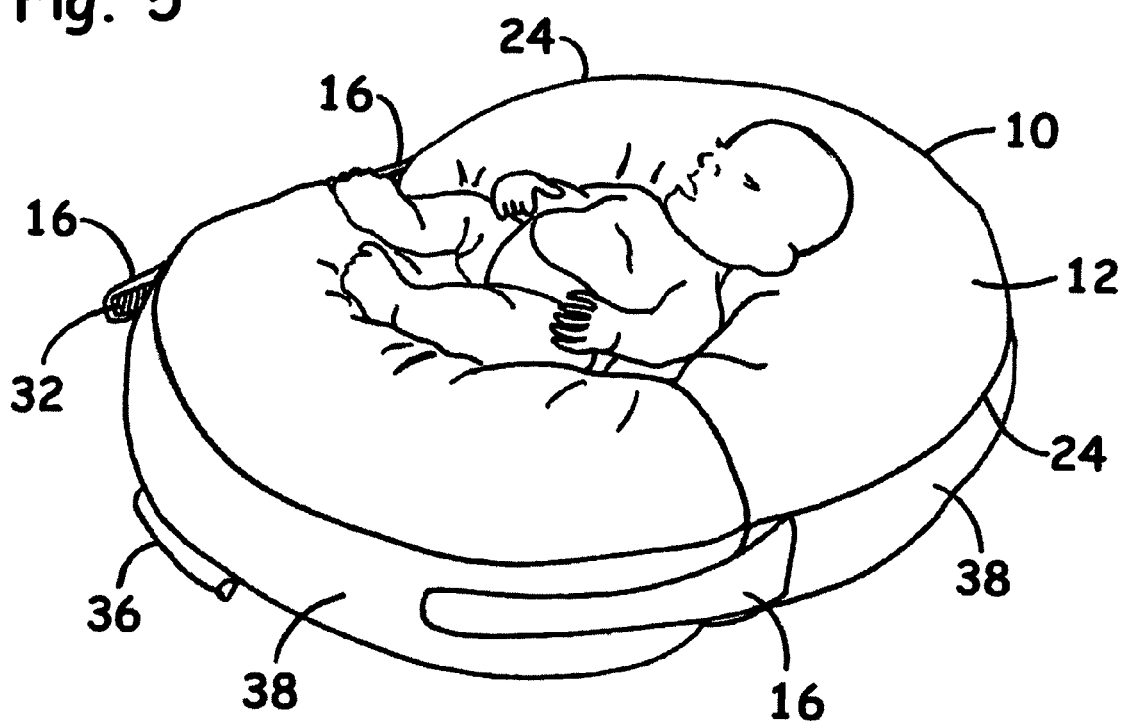
FIG. 5 is a perspective view of the contoured adjustable bathing cushion of the present invention showing an infant positioned on the cushion with the cushion being vertically disposed with relation to the infant.

FIG. 5 shows a contoured adjustable bathing cushion 10 with an infant resting therein, the contoured adjustable bathing cushion being disposed longitudinally with respect to the infant, the buttock area of the infant being received in the depressed central portion 14 (not visible in this figure; see FIG. 2) of the cushion 10 and infant's extremities, including head and neck, arms, and legs (not numbered) being received upon the substantially oval shaped outer portion 12. The contoured adjustable bathing cushion 10 is shortened along the outer edge 24 and band 38 in the manner set forth in FIG. 4 so as to create a sensation of security and snugness for the infant and to decrease the overall length of the contoured adjustable bathing cushion 10 to permit a small infant to nestle comfortably in the depressed central section 14. In this position the infant is held snugly on both sides of his torso to prevent the infant from slipping during bath time.

Figure 6:
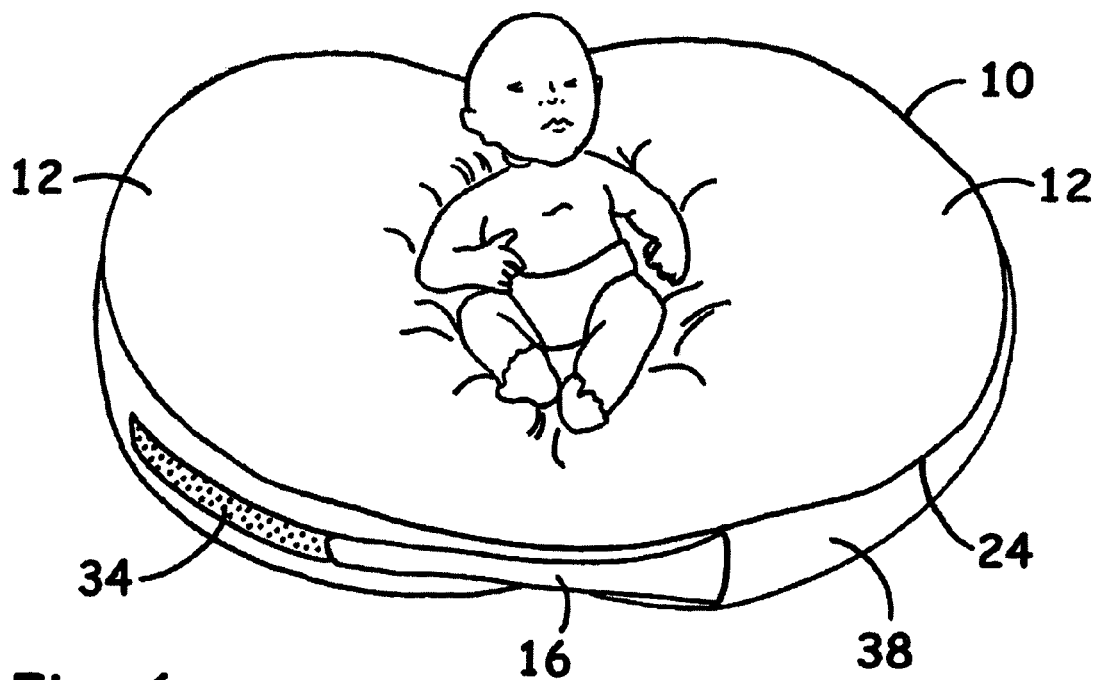
FIG. 6 is a perspective view of the contoured adjustable bathing cushion of the present invention showing an infant positioned on the cushion with the cushion being horizontally disposed with relation to the infant.

FIG. 6 shows a contoured adjustable bathing cushion 10 with an infant resting therein, the contoured adjustable bathing cushion 10 being disposed horizontally with respect to the infant, the buttock are of the infant being received in the depressed central portion 14 of the cushion 10 and infant's extremities, including head and neck, arms, and legs (not numbered) being received upon the substantially oval shaped outer portion 12. The contoured adjustable bathing cushion 10 is shortened to a customized desired length (not as short as that shown in FIG. 5) along the outer edge 24 and band 38 in the manner set forth in FIG. 4 so as to create a sensation of security and snugness for a larger infant and to decrease the overall length of the contoured adjustable bathing cushion 10 to permit a larger infant to nestle comfortably in the depressed central section 14. In this position the infant has greater side to side mobility than the infant shown in FIG. 5 to permit freedom of movement during bath time.

Figure 7:
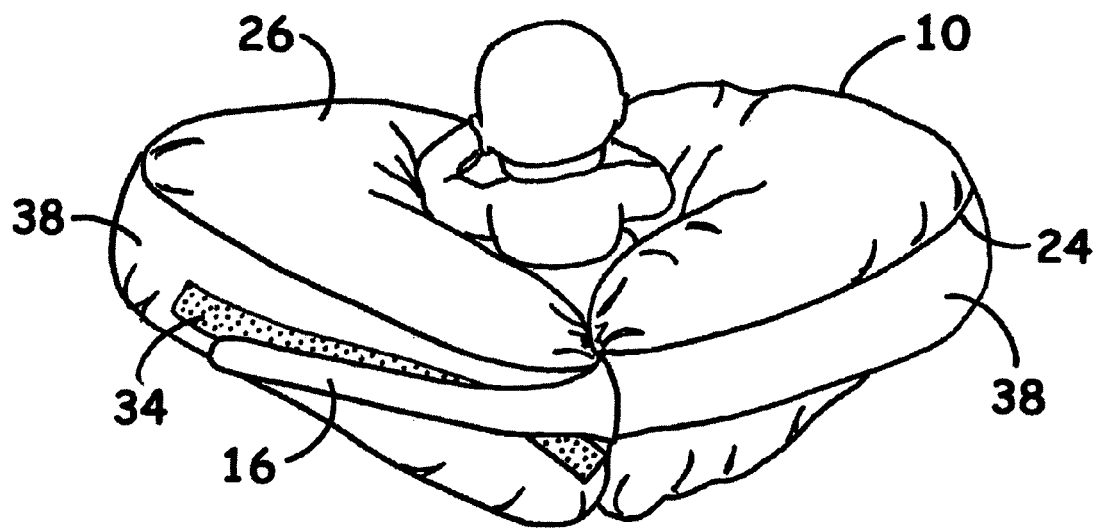
FIG. 7 is a perspective view showing a rear view of the contoured adjustable bathing cushion of the present invention showing an infant positioned on the cushion with the cushion being horizontally disposed with relation to the infant.

FIG. 7 shows a back view of a contoured adjustable bathing cushion 10 with an infant seated therein, the contoured adjustable bathing cushion 10 being disposed horizontally with respect to the infant, the buttocks and legs (not shown) of the infant being received in the depressed central portion 14 of the cushion 10, the infant's arms may or may not rest on the upper portion 26 of the cushion 10, and the infant's head, neck and upper back are free from contact with the contoured adjustable bathing cushion 10. The contoured adjustable bathing cushion 10 is shortened in a manner similar to that shown in FIG. 3 to permit an infant to sit in a substantially upright position while receiving support from the contoured adjustable bathing cushion 10.

Figure 8:
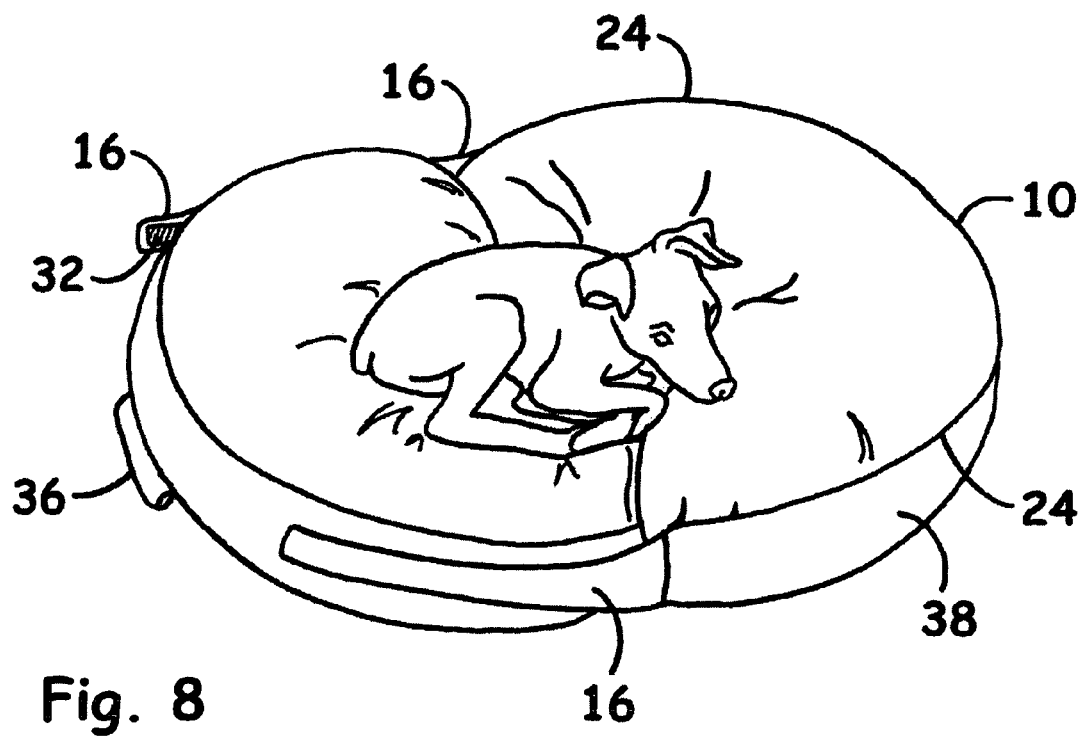
FIG. 8 is a perspective view of the contoured adjustable bathing cushion of the present invention showing a pet (a dog is shown, but the cushion may be used by any small to medium sized house pet) positioned on the cushion with the cushion being horizontally disposed with relation to the pet.

FIG. 8 shows a contoured adjustable bathing cushion 10 with a small animal resting therein, the contoured adjustable bathing cushion 10 being disposed horizontally with respect to the animal, the buttocks of the animal, the entire animal, or any portion thereof may be received in the depressed central portion 14 (not visible in this figure; see FIG. 2) of the cushion 10 or, alternatively, the adjustable tabs 16 may be positioned such that the animal is received upon the substantially oval shaped outer portion 12. The contoured adjustable bathing cushion 10 is shortened to a customized desired length along the outer edge 24 and band 38 in the manner set forth in FIG. 4 so as to create a sensation of security and snugness for the animal and to decrease the overall length of the contoured adjustable bathing cushion 10 to permit a smaller animal to nestle comfortably atop the substantially oval shaped outer portion 12. In this position the animal may position himself comfortably on the contoured adjustable bathing cushion 10. It should be noted that, although in this embodiment a dog is depicted, the cushion may be used for any domesticated animal or pet. If used exclusively in conjunction with an animal, an alternative filler material safe for animal use may be employed.

While FIGS. 1 through 8, inclusive, depict the various positions which may be achieved with the contoured adjustable bathing cushion 10 of the present invention, it should be apparent that other and further modifications of the present invention, apart from those shown or suggested herein, may be made within the spirit and scope of this invention.

What is claimed is:

1. A contoured cushion comprising:
a central portion defined by a perimeter;
a outer portion surrounding the central portion, the outer portion having a top and a bottom and an outer sidewall, the sidewall having an upper edge and a lower edge and defining the circumference of the cushion, the top and bottom each having an inner edge and an outer edge, the inner edges of the top and bottom portion joined to the perimeter of the central portion and the outer edges joined to the sidewall, wherein the cushion has at least a first side and a second side opposite the first side;
wherein the central portion is depressed relative to the top of the outer portion;
a first cinch assembly on the sidewall on the first side of the cushion, wherein the first cinch assembly is operable to adjust the length of the sidewall on the first side of the cushion; and
a second cinch assembly on the sidewall on the second side of the cushion, wherein the second cinch assembly is operable to adjust the length of the sidewall on the second side of the cushion.

2. The contoured cushion of claim 1 wherein each of the cinch assemblies comprises an adjustable tab on the sidewall, and wherein each tab comprises:
a first end attached to the sidewall; and
a second end removably attachable to a range of positions on the sidewall spaced circumferentially a distance from the first end.

3. The contoured cushion of claim 2 wherein each of the cinch assemblies comprises a fastener strip for each tab, each fastener strip attached to the sidewall and adjustably engageable with the second end of the corresponding tab.

4. The contoured cushion of claim 3 wherein the fastener strip comprises hook-and-loop material and wherein the tab includes a mating strip of hook-and-loop material.

5. The contoured cushion of claim 1 wherein the cushion is generally oval-shaped.

6. The contoured cushion of claim 1 wherein the cushion is water-permeable.

7. The contoured cushion of claim 1 wherein the cushion further comprises a hanger for suspending the cushion from a support.

8. The contoured cushion of claim 7 wherein the hanger comprises an elongate, cylindrical loop of fabric.

9. The contoured cushion of claim 1 wherein the sidewall comprises a generally vertical band.

10. The contoured cushion of claim 1 wherein the central portion comprises a generally flat panel of fabric.

11. The contoured cushion of claim 1 wherein the outer portion is formed of filler or stuffing contained within an enclosure made of water permeable fabric and wherein the central portion comprises a generally flat panel of water permeable fabric.

12. The contoured cushion of claim 1 wherein the outer portion is generally oval having a length, wherein each of the first and second cinch assemblies comprises an adjustable tab on the sidewall to permit adjustment of the length of the cushion, and wherein each tab comprises:
    a first end attached to the sidewall; and
    a second end removably attachable to a range of positions on the sidewall spaced circumferentially a distance from the first end.

13. The contoured cushion of claim 12 wherein each of the first and second cinch assemblies comprises a fastener strip for each tab, each fastener strip attached to the sidewall and adjustably engageable with the second end of the corresponding tab.

14. The contoured cushion of claim 13 wherein the depressed central portion and the surrounding outer portion of the cushion are sized so that, when an infant is placed on the cushion with the infant's buttocks in the central portion, the infant's limbs, head, neck and upper body are supported on the outer portion.

\* \* \* \* \*

UNITED STATES PATENT AND TRADEMARK OFFICE
CERTIFICATE OF CORRECTION

| | | |
|---|---|---|
| PATENT NO. | : 8,555,429 B2 | Page 1 of 1 |
| APPLICATION NO. | : 11/193195 | |
| DATED | : October 15, 2013 | |
| INVENTOR(S) | : Jamie S. Leach | |

It is certified that error appears in the above-identified patent and that said Letters Patent is hereby corrected as shown below:

On the Title Page
In the References Cited
Page 2, Column 1, Reference #38: replace "D282,472" with --D282,427--.
Page 2, Column 2, Reference #79: replace "Schwarz-Zōhrer" with --Schwarz-Zöhrer--.
Page 3, Column 1, Reference #11: replace "O'Neil" with --O'Neill--.

In the Specification
Column 1, line 33: replace "U.S. Pat No. D446,675 S" with --Des. 446,675 S--.
Column 1, line 47 to 52: delete "U.S. Pat No.".
Column 1, line 60: replace "Design U.S. Pat. No. D446,675" with --Design Pat No. Des 446,675--.

Column 3, line 18: replace "are" with --is--.

Column 4, line 15: replace "circumferfence" with --circumference--.

Column 5, line 51: replace "are" with --area--.

In the Claims
Column 6, line 42: Claim 1: replace "a outer" with --an outer--.

Signed and Sealed this
Twenty-seventh Day of May, 2014

Michelle K. Lee
*Deputy Director of the United States Patent and Trademark Office*